US006994073B2

(12) United States Patent
Tozzi et al.

(10) Patent No.: US 6,994,073 B2
(45) Date of Patent: Feb. 7, 2006

(54) METHOD AND APPARATUS FOR DETECTING IONIZATION SIGNAL IN DIESEL AND DUAL MODE ENGINES WITH PLASMA DISCHARGE SYSTEM

(75) Inventors: Luigi P. Tozzi, Fort Collins, CO (US); Kelly J. Benson, Fort Collins, CO (US); Matthew Viele, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 10/822,401

(22) Filed: Apr. 12, 2004

(65) Prior Publication Data

US 2005/0092287 A1 May 5, 2005

Related U.S. Application Data

(60) Provisional application No. 60/516,148, filed on Oct. 31, 2003.

(51) Int. Cl.
*F02P 15/00* (2006.01)
*G01L 23/22* (2006.01)

(52) U.S. Cl. ........................ 123/298; 73/35.08; 73/116; 123/143 B; 123/305; 123/406.26; 123/435

(58) Field of Classification Search ............ 123/143 R, 123/143 B, 179.5, 406.26–406.28, 406.41–406.43, 123/435, 620, 298, 305; 313/138, 140, 141; 324/380, 381, 388, 393, 399, 402; 73/35.03–35.08, 73/116, 117.1, 117.3, 119 A; 239/533.2, 239/584, 585.1
See application file for complete search history.

(56) References Cited

U.S. PATENT DOCUMENTS

| | | | | | |
|---|---|---|---|---|---|
| 4,377,140 | A * | 3/1983 | Latsch | | 123/406.26 |
| 4,398,526 | A * | 8/1983 | Hamai et al. | | 123/143 B |
| 4,489,596 | A * | 12/1984 | Linder et al. | | 73/116 |
| 4,535,740 | A * | 8/1985 | Ma | | 123/435 |
| 4,665,740 | A * | 5/1987 | Matsumoto et al. | | 73/116 |
| 5,050,556 | A * | 9/1991 | Williams et al. | | 123/406.28 |
| 5,180,983 | A * | 1/1993 | Murata et al. | | 324/399 |
| 5,211,142 | A * | 5/1993 | Matthews et al. | | 123/143 B |
| 5,568,801 | A * | 10/1996 | Paterson et al. | | 123/143 B |
| 5,777,216 | A | 7/1998 | VanDyne et al. | | |
| 5,834,629 | A * | 11/1998 | Hammarberg | | 73/35.08 |
| 5,904,127 | A * | 5/1999 | Kemmler et al. | | 123/435 |
| 6,029,627 | A | 2/2000 | VanDyne | | |
| 6,289,868 | B1 * | 9/2001 | Jayne | | 123/260 |
| 6,429,020 | B1 | 8/2002 | Thornton et al. | | |
| 6,614,230 | B2 * | 9/2003 | Raichle et al. | | 324/399 |
| 6,887,069 | B1 * | 5/2005 | Thornton et al. | | 431/12 |

FOREIGN PATENT DOCUMENTS

JP 63-215878 * 9/1988

* cited by examiner

*Primary Examiner*—Tony M. Argenbright
(74) *Attorney, Agent, or Firm*—Reinhart Boerner Van Deuren P.C.

(57) ABSTRACT

An apparatus and method to detect combustion conditions using ion signals for use in a feedback control of a diesel engine is presented. The apparatus is a spark plug type of sensor or a sensor integrated with a fuel injector. The spark plug type of sensor is used to provide a cold start mechanism combined with an ion sensing device.

34 Claims, 16 Drawing Sheets

METHOD AND APPARATUS FOR DETECTING IONIZATION SIGNAL IN DIESEL AND DUAL MODE ENGINES WITH PLASMA DISCHARGE SYSTEM

CROSS-REFERENCE TO RELATED PATENT APPLICATIONS

This patent application claims the benefit of U.S. Provisional Patent Application No. 60/516,148, filed Oct. 31, 2003.

FIELD OF THE INVENTION

The present invention relates generally to ignition systems in diesel engines, and more particularly relates to such systems in diesel engines in which combustion is started with a plasma discharge system.

BACKGROUND OF THE INVENTION

Government agencies and industry standard setting groups are reducing the amount of allowed emissions in stoichiometric and diesel engines in an effort to reduce pollutants in the environment. For example, over the past decade, increasingly more stringent heavy duty on-highway engine emission regulations have led to the development of engines in which $NO_x$ and diesel particulate emissions have been reduced by as much as seventy percent and ninety percent, respectively. Proposed regulations for new heavy duty engines require additional $NO_x$ and diesel particulate emission reductions of over seventy percent from existing emission limits. These emission reductions represent a continuing challenge to engine design due to the $NO_x$-diesel particulate emission and fuel economy tradeoffs associated with most emission reduction strategies. Emission reductions are also desired for the on and off-highway in-use fleets.

Traditionally, there have been two primary forms of reciprocating piston or rotary internal combustion engines. These forms are diesel and spark ignition engines. While these engine types have similar architecture and mechanical workings, each has distinct operating properties that are vastly different from each other. The diesel engine controls the start of combustion (SOC) by the timing of fuel injection. A spark ignited engine controls the SOC by the spark timing. As a result, there are important differences in the advantages and disadvantages of diesel and spark-ignited engines. The major advantage that a spark-ignited natural gas, or gasoline, engine (such as passenger car gasoline engines and lean burn natural gas engines) has over a diesel engine is the ability to achieve extremely low $NO_x$ and particulate emissions levels. The major advantage that diesel engines have over premixed charge spark ignited engines is higher thermal efficiency.

One reason for the higher efficiency of diesel engines is the ability to use higher compression ratios than spark ignited engines because the compression ratio in spark ignited engines has to be kept relatively low to avoid knock. Typical diesel engines, however, cannot achieve the very low $NO_x$ and particulate emissions levels that are possible with premixed charge spark ignited engines. Due to the mixing controlled nature of diesel combustion a large fraction of the fuel exists at a very fuel rich equivalence ratio, which is known to lead to particulate emissions. Spark ignited engines, on the other hand, have nearly homogeneous air fuel mixtures that tend to be either lean or close to stoichiometric, resulting in very low particulate emissions. A second consideration is that the combustion in diesel engines occurs when the fuel and air exist at a near stoichiometric equivalence ratio which leads to high temperatures. The high temperatures, in turn, cause high $NO_x$ emissions. Lean burn spark ignited engines, on the other hand, burn their fuel at much leaner equivalence ratios which results in significantly lower temperatures leading to much lower $NO_x$ emissions. Stoichiometric spark ignited engines, on the other hand, have high $NO_x$ emissions due to the high flame temperatures resulting from stoichiometric combustion. However, the virtually oxygen free exhaust allows the $NO_x$ emissions to be reduced to very low levels with a three-way catalyst.

Recently, some members of industry have directed their efforts to another type of engine that utilizes homogeneous charge compression ignition (HCCI) to reduce emissions. Engines operating on HCCI principles rely on autoignition of a premixed fuel/air mixture to initiate combustion. The fuel and air are mixed, in the intake port or the cylinder, before ignition occurs. The extent of the mixture may be varied depending on the combustion characteristics desired. Some engines are designed and/or operated to ensure the fuel and air are mixed into a homogeneous, or nearly homogeneous, state. Additionally, an engine may be specifically designed and/or operated to create a somewhat less homogeneous charge having a small degree of stratification. In both instances, the mixture exists in a premixed state well before ignition occurs and is compressed until the mixture autoignites. HCCI combustion is characterized in that the vast majority of the fuel is sufficiently premixed with the air to form a combustible mixture throughout the charge by the time of ignition and throughout combustion and combustion is initiated by compression ignition. Unlike a diesel engine, the timing of the fuel delivery, for example the timing of injection, in a HCCI engine does not strongly affect the timing of ignition. The early delivery of fuel in a HCCI engine results in a premixed charge that is very well mixed, and preferably nearly homogeneous, thus reducing emissions, unlike the stratified charge combustion of a diesel, which generates higher emissions. Preferably, HCCI combustion is characterized in that most of the mixture is significantly leaner than stoichiometric to reduce emissions, which is unlike the typical diesel engine cycle in which a large portion, or all, of the mixture exists in a rich state during combustion Other members of industry have moved to "dual mode" engines that operate on both a gaseous fuel mixture and diesel fuel. These engines operate in HCCI mode at part load and in diesel mode or SI mode at full load. As a result, dual mode engines produce low emissions similar to spark ignited natural gas engines and high thermal efficiency similar to diesel engines. In particular, in known dual mode engines using diesel fuel and natural gas at high load, only a small amount of diesel fuel is required to start ignition and the emissions produced would be similar to a spark ignited natural gas engine. Under other conditions when substantial diesel fuel is injected, the emissions produced would be similar to a conventional diesel engine.

In order to monitor emissions, it is required to detect engine combustion conditions during engine operation. Of all the measuring methods for detecting engine combustion conditions, ion current measurement has been considered to be highly useful because it can be used for directly observing the chemical reaction resulting from the engine combustion. However, ion current detectors are typically incorporated into glow plugs. For example, an electric conductive layer made of platinum is formed on a surface of the heating element of the glow plug and is electrically insulated from the combustion chamber and the glow plug clamping fixture.

In these glow plugs, ignition and combustion of fuel are generally promoted by a heating action of the glow plug heating element when the engine starts at low temperature. The heating state of the heating element usually continues after warm-up of the engine has been completed until the combustion is stabilized (generally, referred to as "after-glow"). After completion of the afterglow, the heating action of the glow plug is stopped and the process of detecting ion current is started. Carbon adheres to the circumference of the ceramic heating portion of the glow plug and reduces the insulation resistance between the exposed electrode used for ion current detection and the grounded portion (plug housing and cylinder head) that is insulated from the electrode. In this case, a flow of leakage current may be created through the adhered carbon even if no ion is derived from the combustion gases. When this happens, the ion current detected shows a waveform different from a desired one due to occurrence of the leakage current, and such an incorrect detection result causes deterioration in the accuracy of ignition stage and flame failure detections. Furthermore, the electrode is almost completely exposed into the combustion chamber and the space between the housing and the electrode is narrow. For this reason, there is a danger that the electrode is shorted to the ground and the housing is made conductive due to adhesion of carbon to the electrode surface, resulting in an error in detecting ion current.

Additionally, since the ion current detecting electrode supported at the tip of the glow plug directly touches a flame having a high temperature, stresses tend to be concentrated in the neighborhood of the ion current detecting electrode and could damage the ceramic glow plug such as to crack it.

BRIEF SUMMARY OF THE INVENTION

In view of the foregoing, an object of the present invention is to reliably detect ionization signals in diesel engines and dual mode engines.

The foregoing objects are among those attained by the invention, which provides an apparatus for detecting ionization current. The apparatus includes a spark plug type of sensor that is shielded from direct impingement of fuel spray and the engulfment of a diffusive flame. In an alternate embodiment of the spark plug type of sensor, the apparatus includes a high energy plasma discharge plug suitable for direct impingement of fuel spray and engulfment of diffusive flame. The spark plug detects combustion ion current, which correlates to the $NO_x$ level and in-cylinder pressure produced by the combustion process. The spark plug sensor may also be used to replace glow plugs to provide a cold start mechanism for diesel ignition.

In an alternate embodiment of the apparatus, the ion sensing apparatus is integrated into the fuel injector of the combustion chamber. The fuel injector is modified by putting a positive electrode and heater element on the fuel injector using either a separate sleeve or integrated directly into the nozzle of the fuel injector. The positive electrode is heated to approximately 700 C or higher to protect the electrode.

Additional features and advantages of the invention will be made apparent from the following detailed description of illustrative embodiments, which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides an apparatus and method to detect combustion ion current in a diesel combustion engine for use in various control functions that use ionization signals such as EGR (Exhaust Gas Recirculation) control, diesel injection timing control from ignition, and cold starts of diesel engines. As used herein, the term "diesel engine" refers to typical diesel engines, HCCI engines and dual mode engines.

Figure 1:
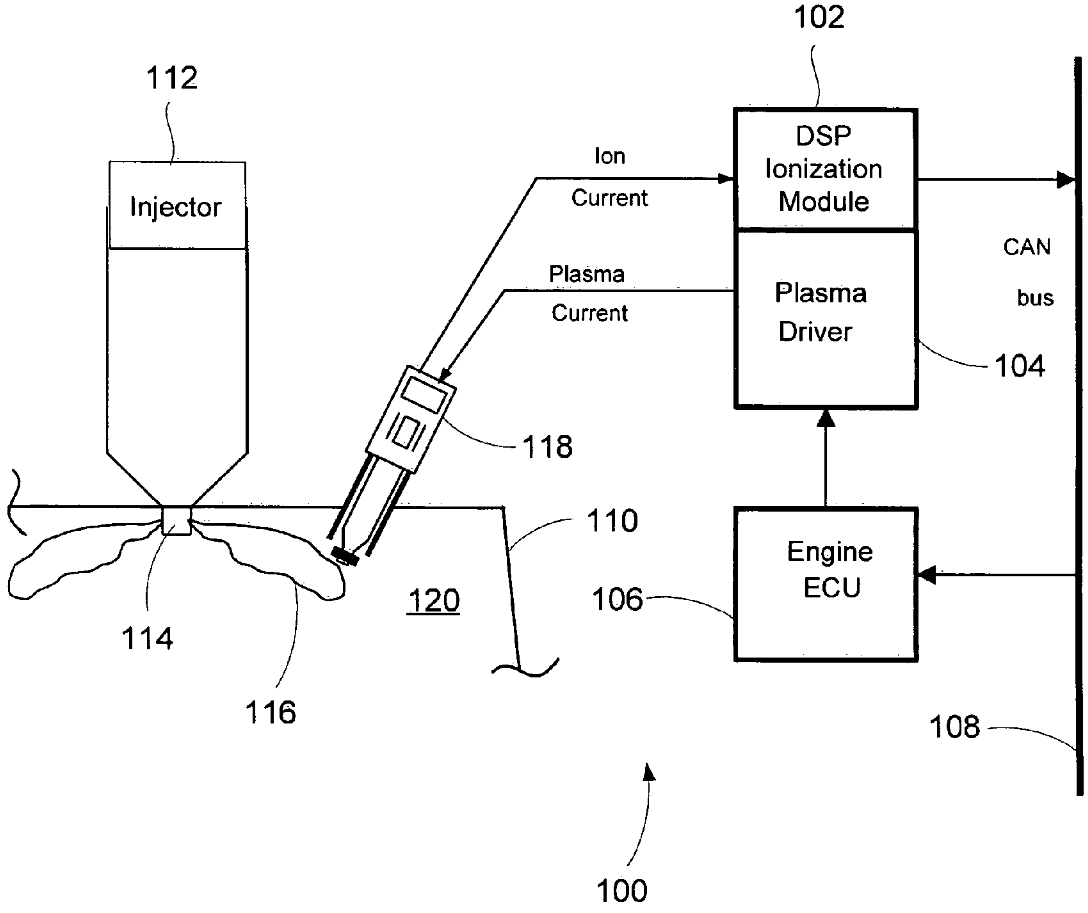
FIG. 1 is a schematic view of a plasma ignition control of the present invention.

Referring initially to FIG. 1, a system 100 exemplifying the present invention is shown. The system includes an ionization module 102, a plasma driver 104, an engine electronic control unit (ECU) 106, and a diesel engine. The ionization module 102 communicates with the ECU 106 and other modules via, for example, the CAN (Controller Area Network) bus 108. While the ionization module 102, the plasma driver 104 and the engine control unit 106 are shown separately, it is recognized that the components 102, 104, 106 may be combined into a single module or be part of an engine controller having other inputs and outputs. The diesel engine includes engine cylinder 110 that has a piston, an intake valve and an exhaust valve (not shown). An intake manifold is in communication with the cylinder 110 through the intake valve. An exhaust manifold receives exhaust gases from the cylinder via an exhaust valve. The intake valve and exhaust valve may be electronically, mechanically, hydraulically, or pneumatically controlled or controlled via a camshaft. A fuel injector 112 injects fuel 116 into the cylinder 110 via nozzle 114. An ion sensing apparatus 118 is used to sense ion current and in one embodiment, ignites the air/fuel mixture in the combustion chamber 120 of the cylinder 110 during cold starts. The plasma driver 104 provides power to the ion sensing apparatus 118 to provide a high energy plasma discharge to keep the ion sensing detection area of the ion sensing apparatus clean from fuel contamination due to carbon buildup. While shown separate from the fuel injector 112, the ion sensing apparatus 118 may be integrated with the fuel injector 112 as described herein.

Figure 2:
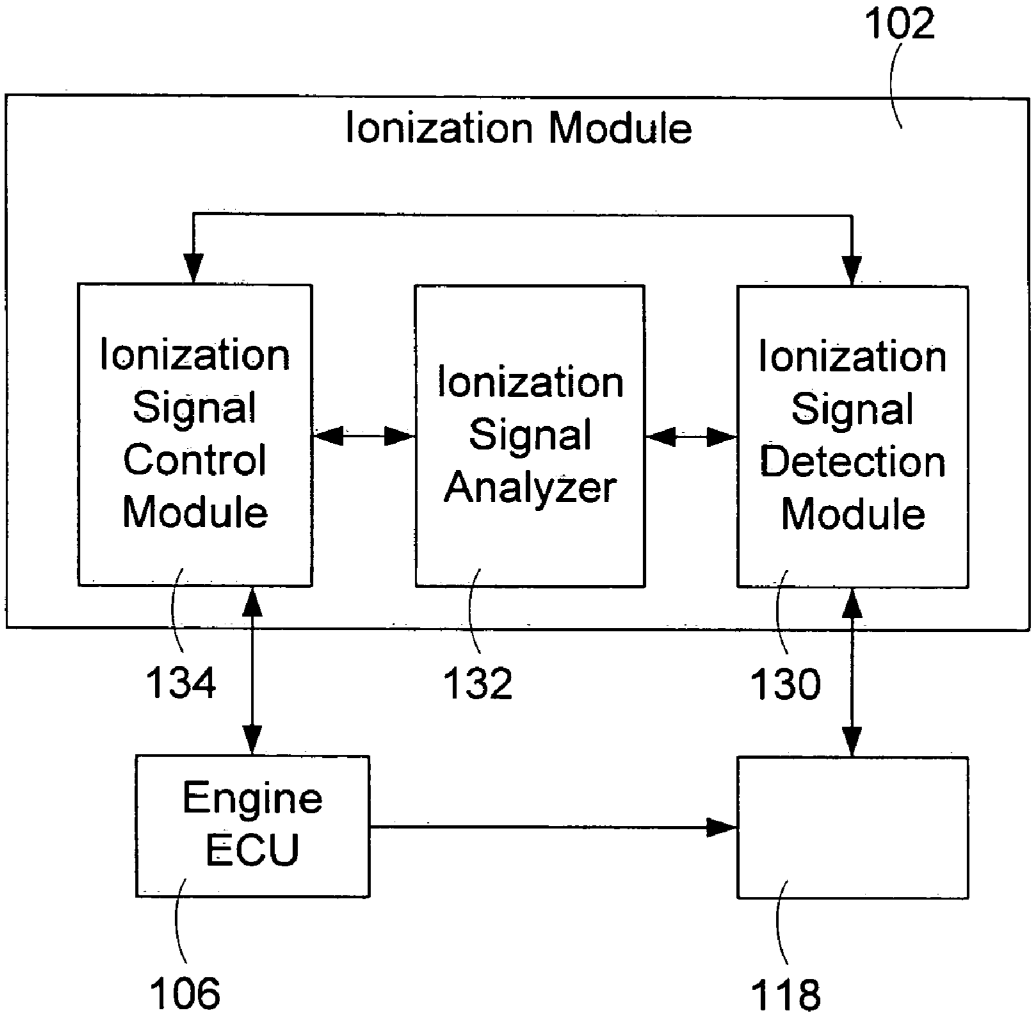
FIG. 2 is a block diagram view of the a portion of the plasma ignition control of FIG. 1.

The ionization module contains circuitry for detecting and analyzing the ionization signal. In the illustrated embodiment, as shown in FIG. 2, the ionization module 102 includes an ionization signal detection module 130, an ionization signal analyzer 132, and an ionization signal control module 134. In order to detect combustion conditions, the ionization module 102 supplies power to the ion sensing apparatus 118 after the air and fuel mixture is ignited and measures ionization signals from ion sensing apparatus 118 via ionization signal detection module 130. Ionization signal analyzer 132 receives the ionization signal from ionization signal detection module 130 and determines combustion conditions and characteristics such as start of combustion and combustion duration. The ionization signal control module 134 controls ionization signal analyzer 132 and ionization signal detection module 130. The ionization signal control module 134 provides an indication to the engine ECU 106 as described below. In one embodiment, the ionization module 102 sends the indication to other modules in the engine system. While the ionization signal detection module 130, the ionization signal analyzer 132, and the ionization signal control module 134 are shown separately, it is recognized that they may be combined into a single module and/or be part of an engine controller having other inputs and outputs.

Returning now to FIG. 1*a*, the ECU 106 controls fuel injection 112 and may control a throttle valve (not shown) to deliver air and fuel, at a desired ratio, to the engine cylinder 110. The ECU 106 receives feedback from the ionization module and adjusts the fuel as described below.

Figure 3:
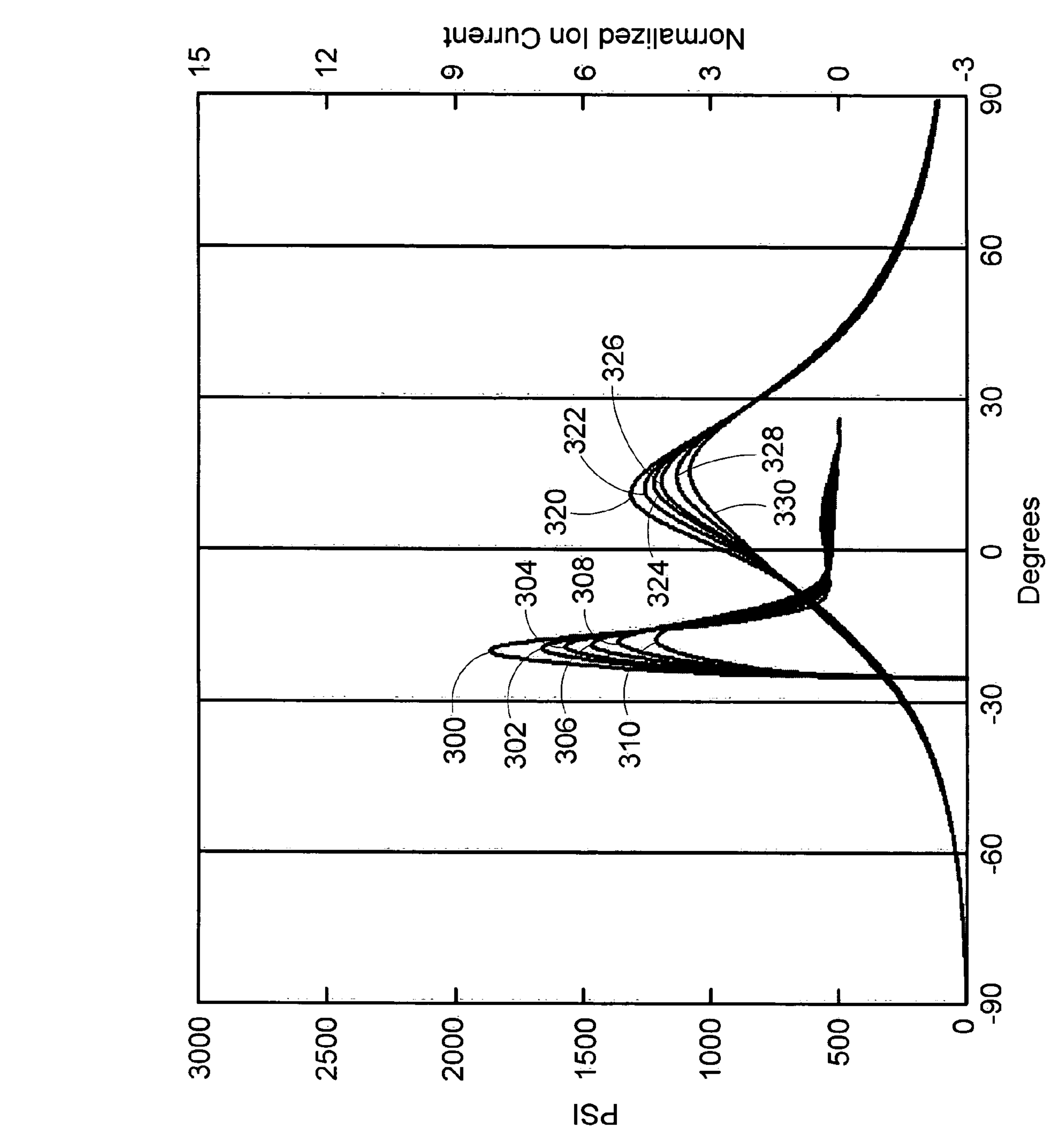
FIG. 3 is a graphical illustration of spark ignited combustion pressure and ionization current versus engine piston crank angle at various levels of $NO_x$.

The ionization signal can be correlated to the level of $NO_x$ emission and in-cylinder pressure produced during combustion. Turning now to FIG. 3, the correlation between cylinder combustion pressure traces, ion current traces and $NO_x$ levels in a spark ignited natural gas engine is shown. Curves 300 to 310 are ion current traces and curves 320 to 330 are cylinder pressure traces. Curves 300 and 320 correspond to a $\lambda$ of 1.58 and a $NO_x$ level of 3.2 gr/BHP*hour, where $$\lambda = \frac{\text{Actual air/fuel ratio}}{\text{Stochiometric air/fuel ratio}}.$$

Curves 302 and 322 correspond to a $\lambda$ of 1.60 and a $NO_x$ level of 1.9 gr/BHP*hour. Curves 304 and 324 correspond to a $\lambda$ of 1.61 and a $NO_x$ level of 1.2 gr/BHP*hour. Curves 306 and 326 correspond to a $\lambda$ of 1.62 and a $NO_x$ level of 1.1 gr/BHP*hour. Curves 308 and 328 correspond to a $\lambda$ of 1.63 and a $NO_x$ level of 0.79 gr/BHP*hour. Curves 310 and 330 correspond to a $\lambda$ of 1.64 and a $NO_x$ level of 0.35 gr/BHP*hour. It can be seen that as the $NO_x$ level decreases from 3.2 gr/BHP*hour to 0.35 gr/BHP*hour, the magnitude of the ion signal and the location of its peak vary in a consistent trend. Similarly, the cylinder pressure traces follow the same trend exhibited by the ion current traces.

Figure 4:
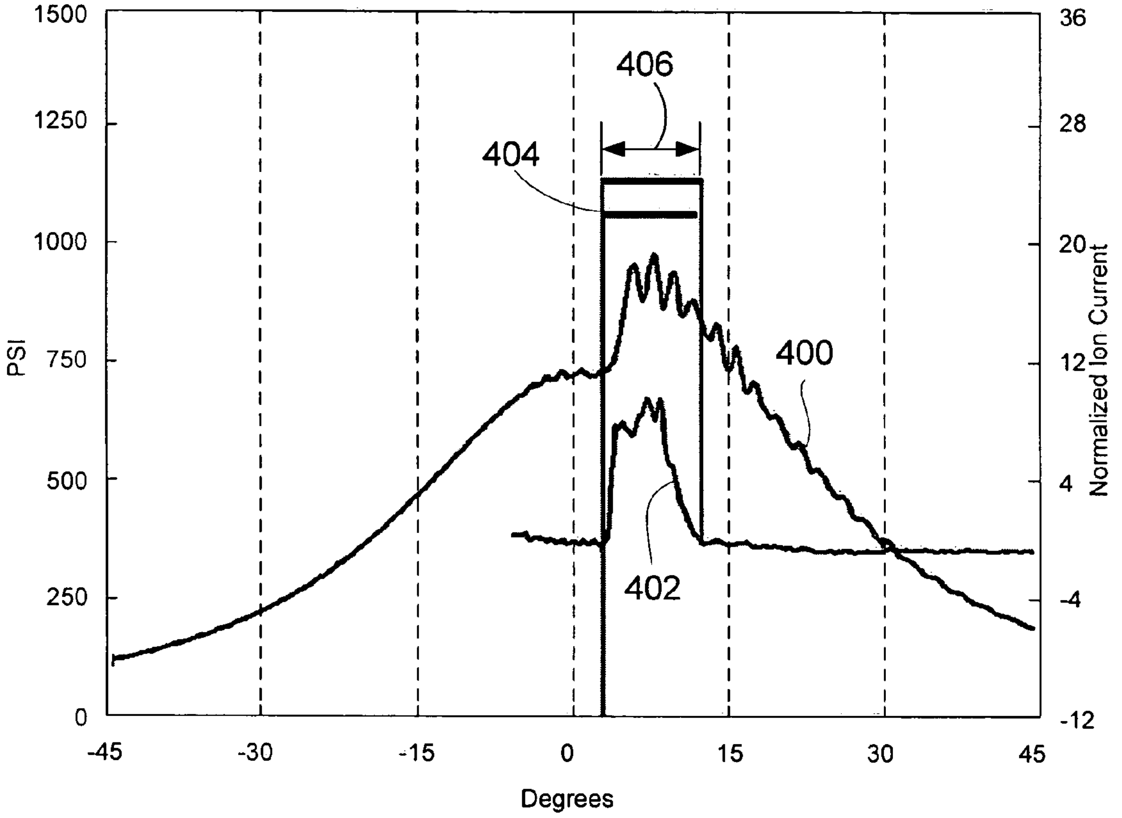
FIGS. 4–7 are graphical illustrations of diesel combustion pressure and ionization current versus engine piston crank angle for various conditions of speed and load.
Figure 5:
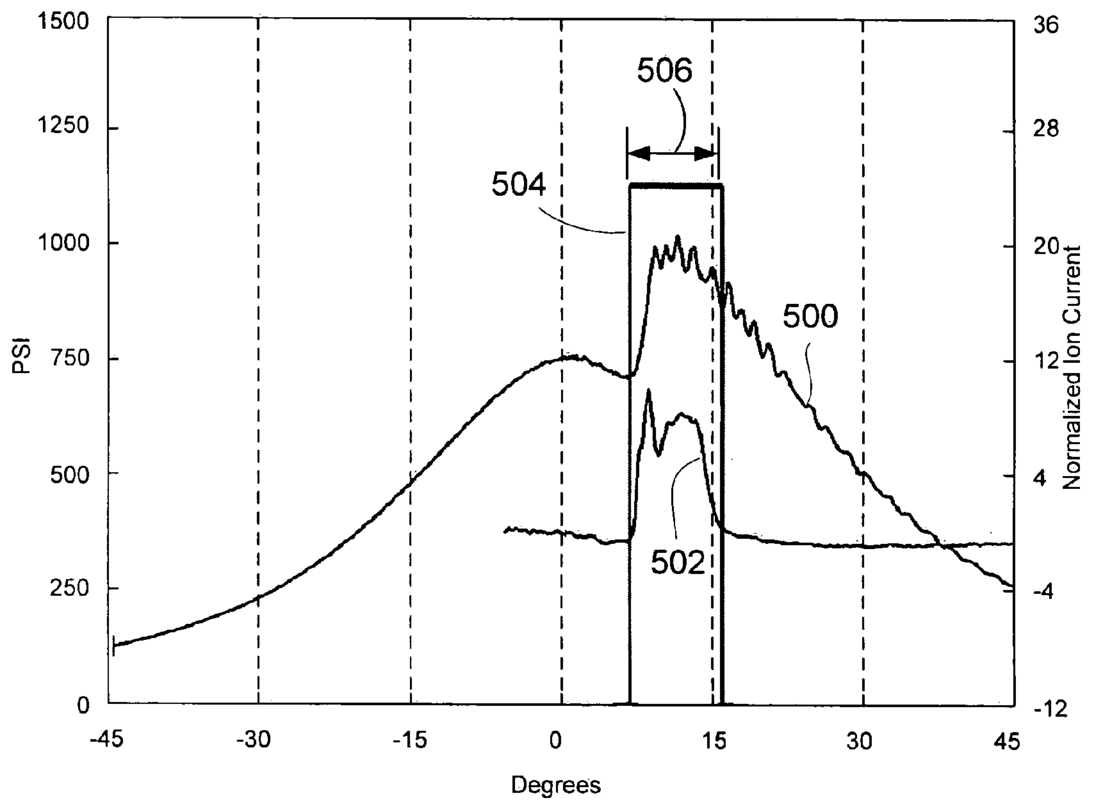
Figure 6:
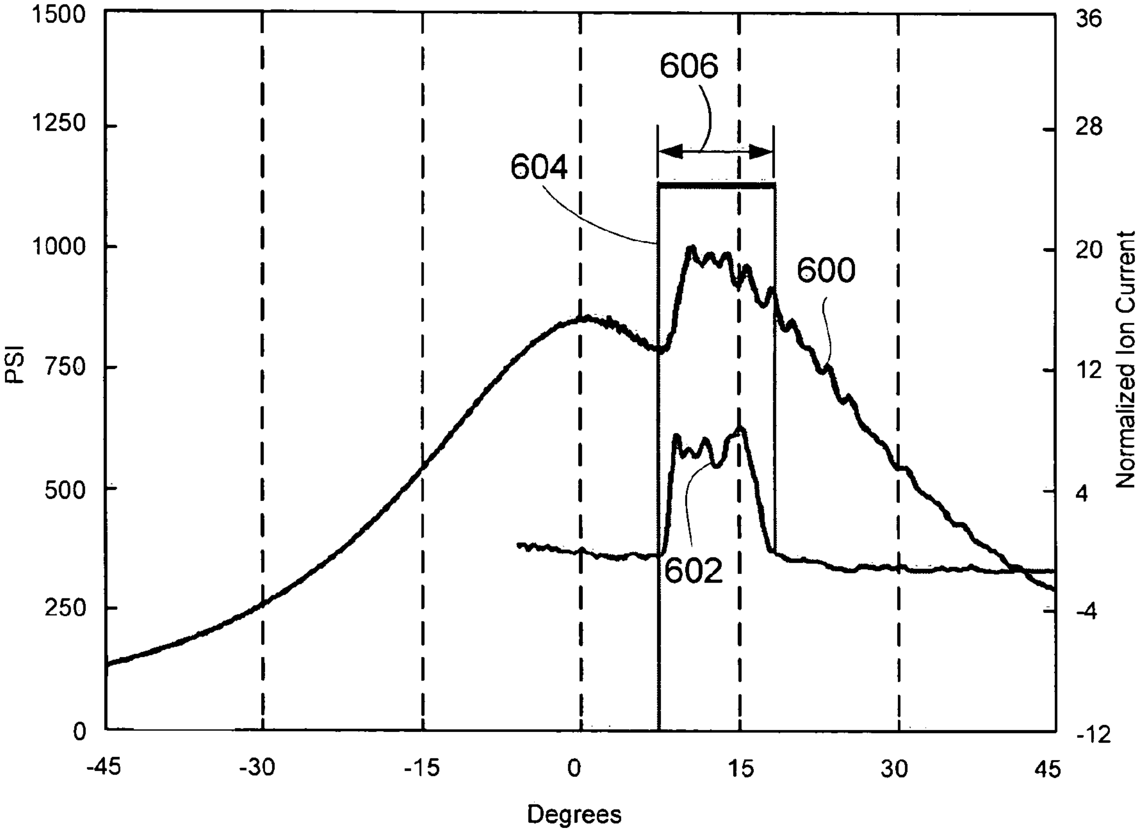
Figure 7:
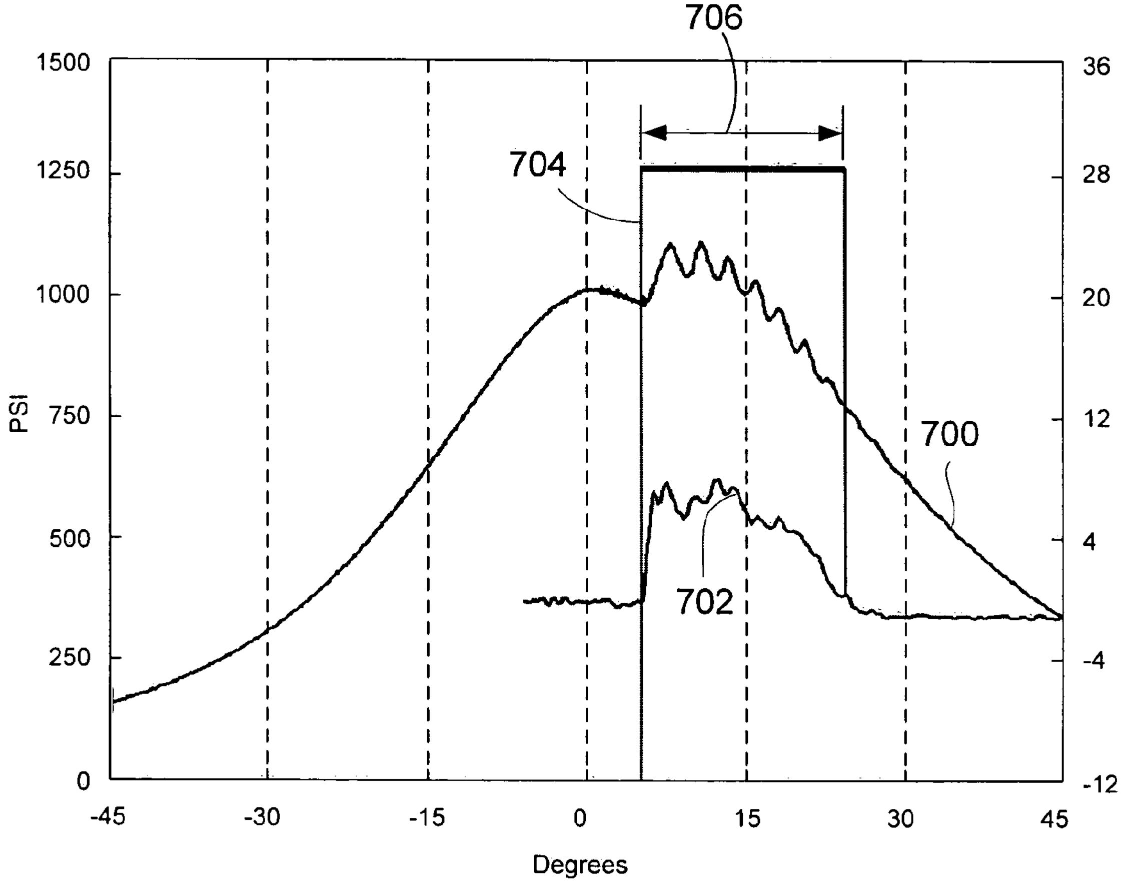

Turning now to FIGS. 4–6, the relationship between diesel combustion pressure and ion current at various speeds and loads is shown. FIG. 4 shows the relationship of pressure 400 and ion current 402 at an engine speed of 1500 rpm and a load of 50 ft-lb. The start of combustion 404 and combustion duration 406 are also shown. FIG. 5 shows the relationship of pressure 500 and ion current 502 at an engine speed of 1500 rpm and a load of 150 ft-lb. The start of combustion 504 and combustion duration 506 are also shown. FIG. 6 shows the relationship of pressure 600 and ion current 602 at an engine speed of 2000 rpm and a load of 150 ft-lb. The start of combustion 604 and combustion duration 606 are also shown. FIG. 7 shows the relationship of pressure 700 and ion current 702 at an engine speed of 2500 rpm and a load of 150 ft-lb. The start of combustion 704 and combustion duration 706 are also shown. From these figures, it can be seen that the rise of the ion current is located proximate to or at the start of combustion and the width of the ionization signal (i.e., the "crank angle distance" between the rise of the ion current and the fall of ion current) approximately lines up with the combustion duration 406, 506, 606, 607 derived from the combustion pressure 400, 500, 600, 700.

Figure 8A:
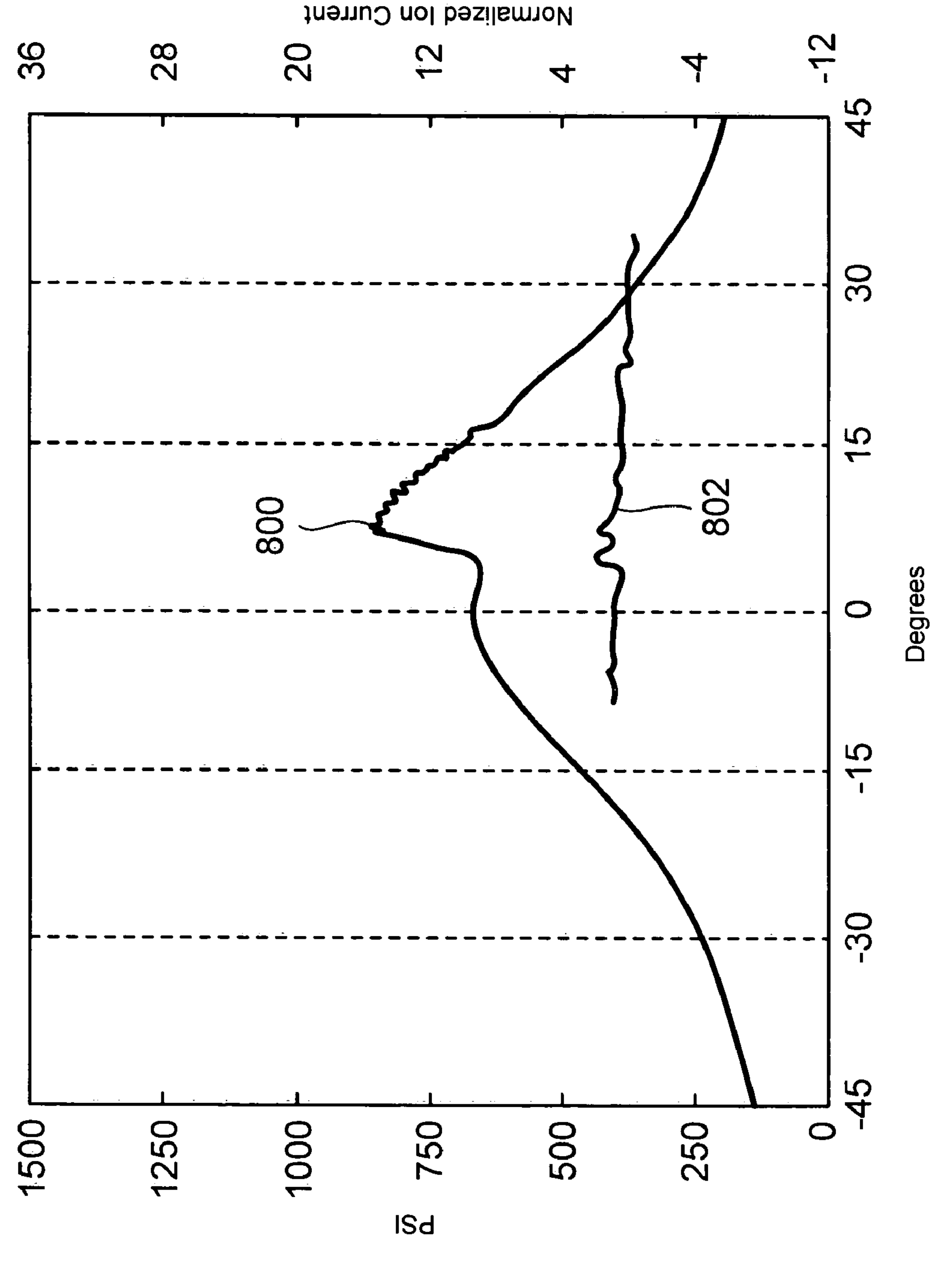
FIGS. 8*a*–8*d* are graphical illustrations of diesel combustion pressure and ionization current versus engine piston crank angle sequence with the ionization signal recovering from plasma plug fouling using the teachings of the present invention.

From FIGS. 3–7, it can be seen that ion current signals can be used to control and optimize engine combustion performance. The ion sensing apparatus can be a separate unit or it can be integrated with the fuel injector. The sensor apparatus should be shielded from direct impingement of fuel spray from the fuel injector. If the fuel spray impinges the sensing mechanism, the ion current does not track combustion pressure if the fuel shorts the sensor. This is illustrated in FIG. 8*a* where it can be seen that the ion current 802 does not track the combustion pressure 800.

Figure 9A:
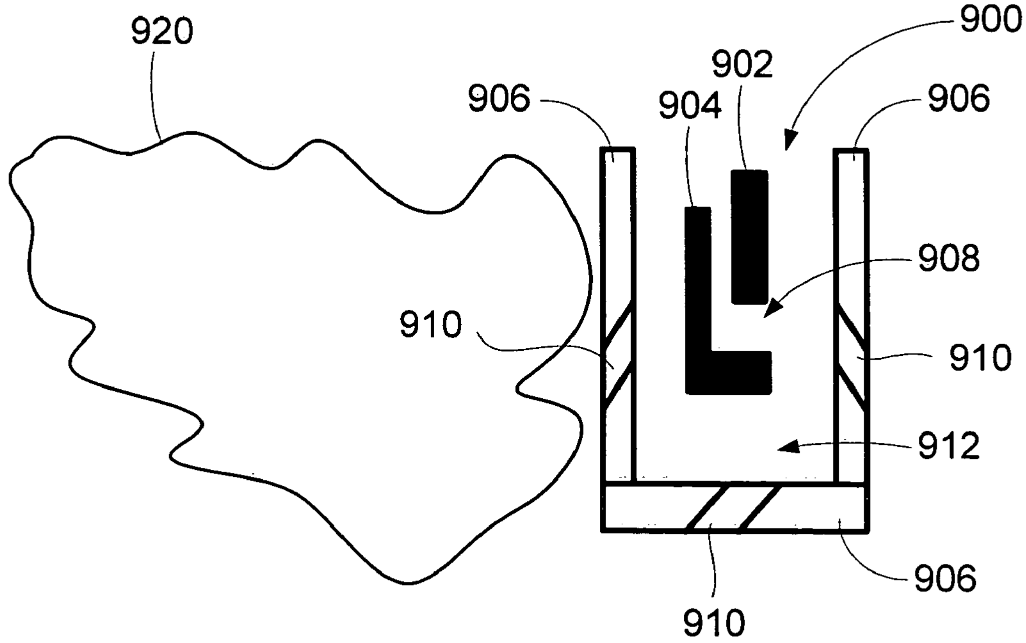
FIG. 9*a* is a schematic view of an embodiment of an ion sensor in accordance with the present invention showing the ion sensor during a fuel spray impingement.
Figure 9B:
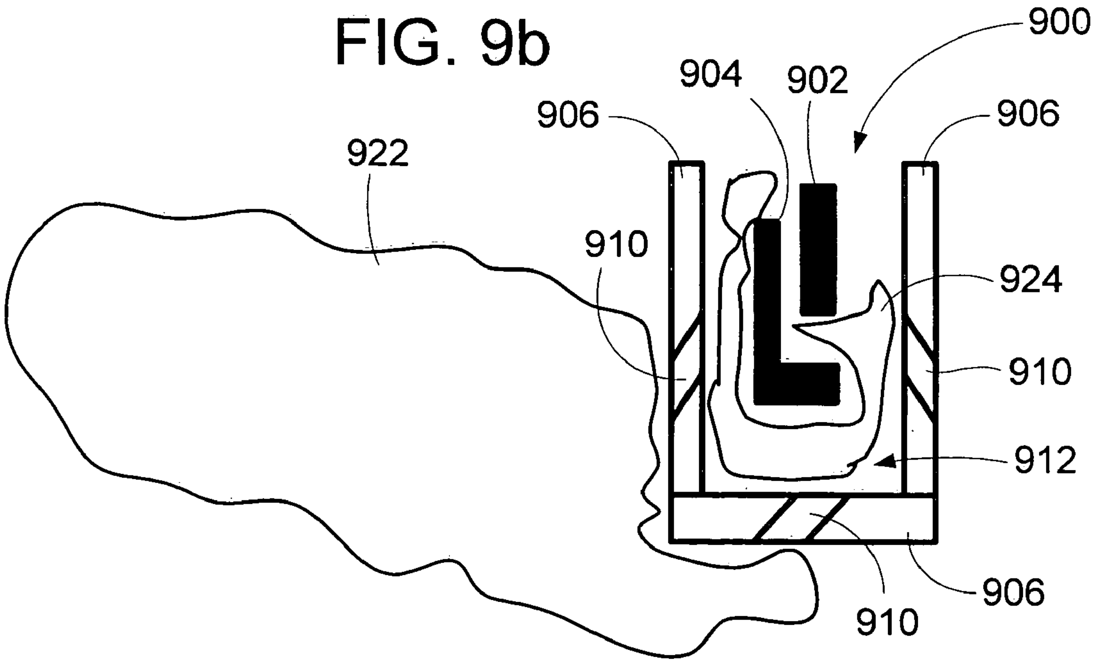
FIG. 9*b* is a schematic of the ion sensor of FIG. 9*a* during a diffusive flame engulfment.
Figure 10A:
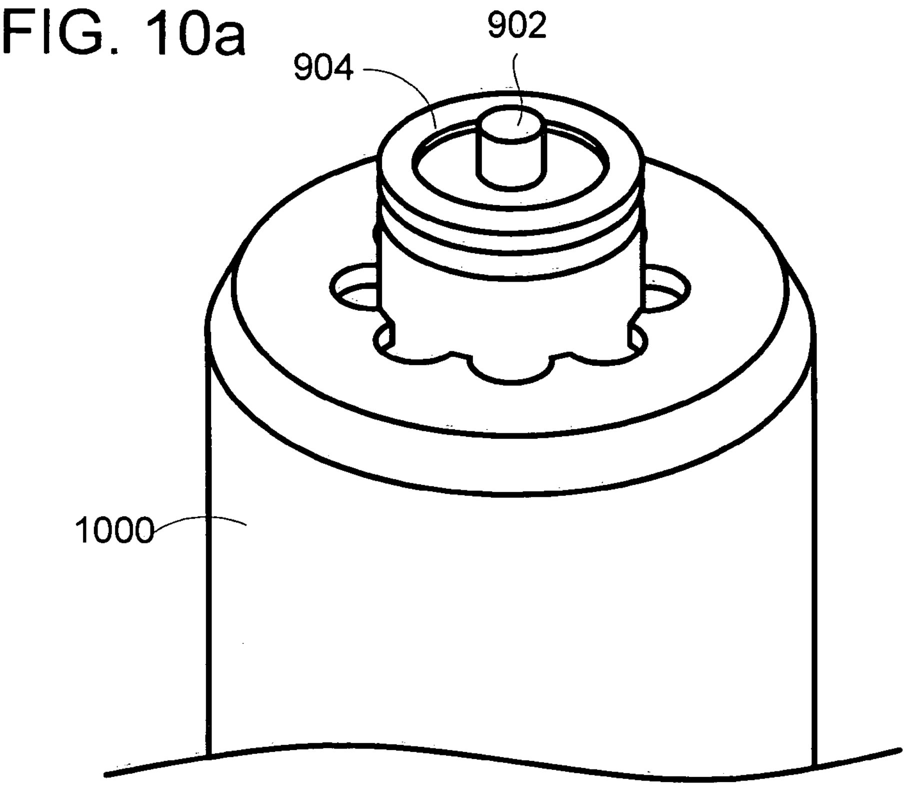
FIG. 10 is an isometric view of the ion sensor of FIGS. 9*a*–9*b;*
Figure 10B:
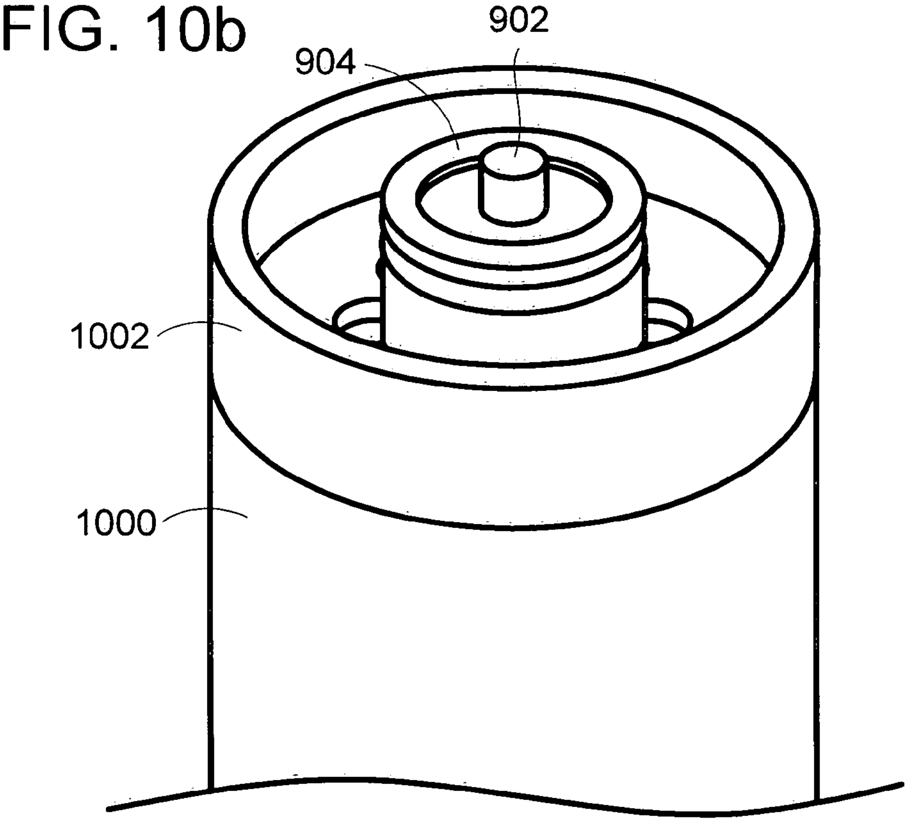

Turning now to FIGS. 9*a*–9*b*, a spark plug type of sensor is shown. FIGS. 9*a* and 9*b* show a block diagram of a spark plug type of sensor. The sensor electrodes 902, 904 of sensor 900 is shielded by shield 906. The presence of the shield 906 drastically reduces fouling of the sensor electrodes 902, 904 and sensor conduction area 908 from the liquid fuel spray 920. During combustion, the diffusive flame 922 is filtered through the induction orifices 908, which causes primarily premixed flame 924 to occur within the sensor's shielded space 910. The presence of the shield 906 allows detection of combustion ions from the pre-mixed flame instead of the diffusive flame, thereby allowing correlation with combustion quality (e.g., $NO_x$ emission level). The size, number, and direction of induction orifices 908 are determined in one embodiment using design of experiments (DOE) as is known in the art. It should be noted that the shield does not have to completely enclose the sensor electrodes 902, 904. In some scenarios, fuel impingement and pre-mixed flame engulfment on the sensor's sensing element are inconsequential or desired. In such a scenario, the extent of shielding can be reduced or eliminated. Turning to FIGS. 10*a* and 10*b*, a shroud 1002 located at the sensor area can be attached to the sensor body 1000 of the plug shown in FIG. 10*a*. The shroud 1002 is sized such that fuel spray does not directly impinge the sensor electrodes 902, 904 and sensor conduction area 908. During operation, the sensor electrodes 902, 904 can be energized with a high-energy current that creates a high-energy plasma discharge that keeps the sensor electrode area clean from fuel contamination and carbon build-up.

Figure 8B:
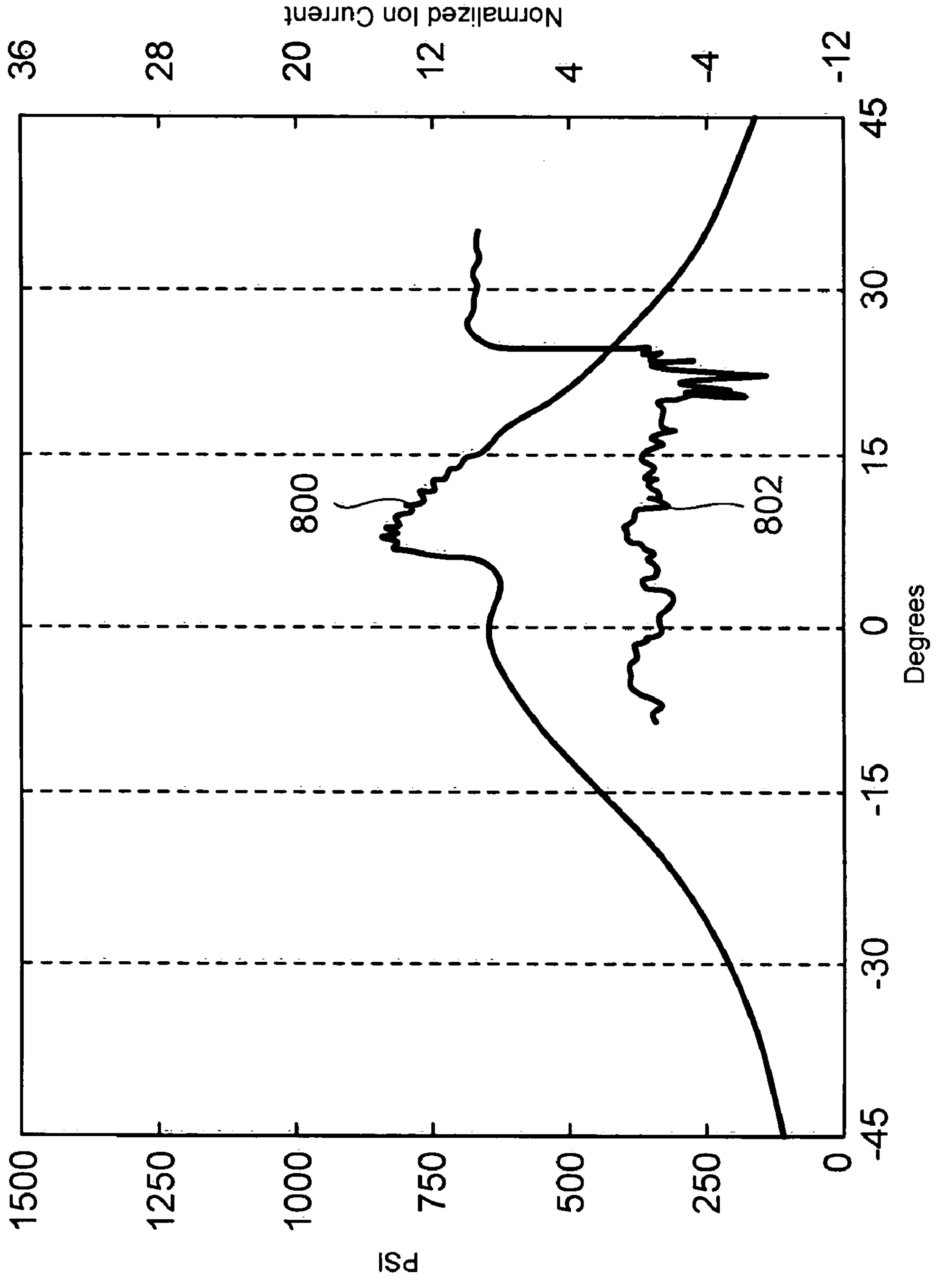
Figure 8C:
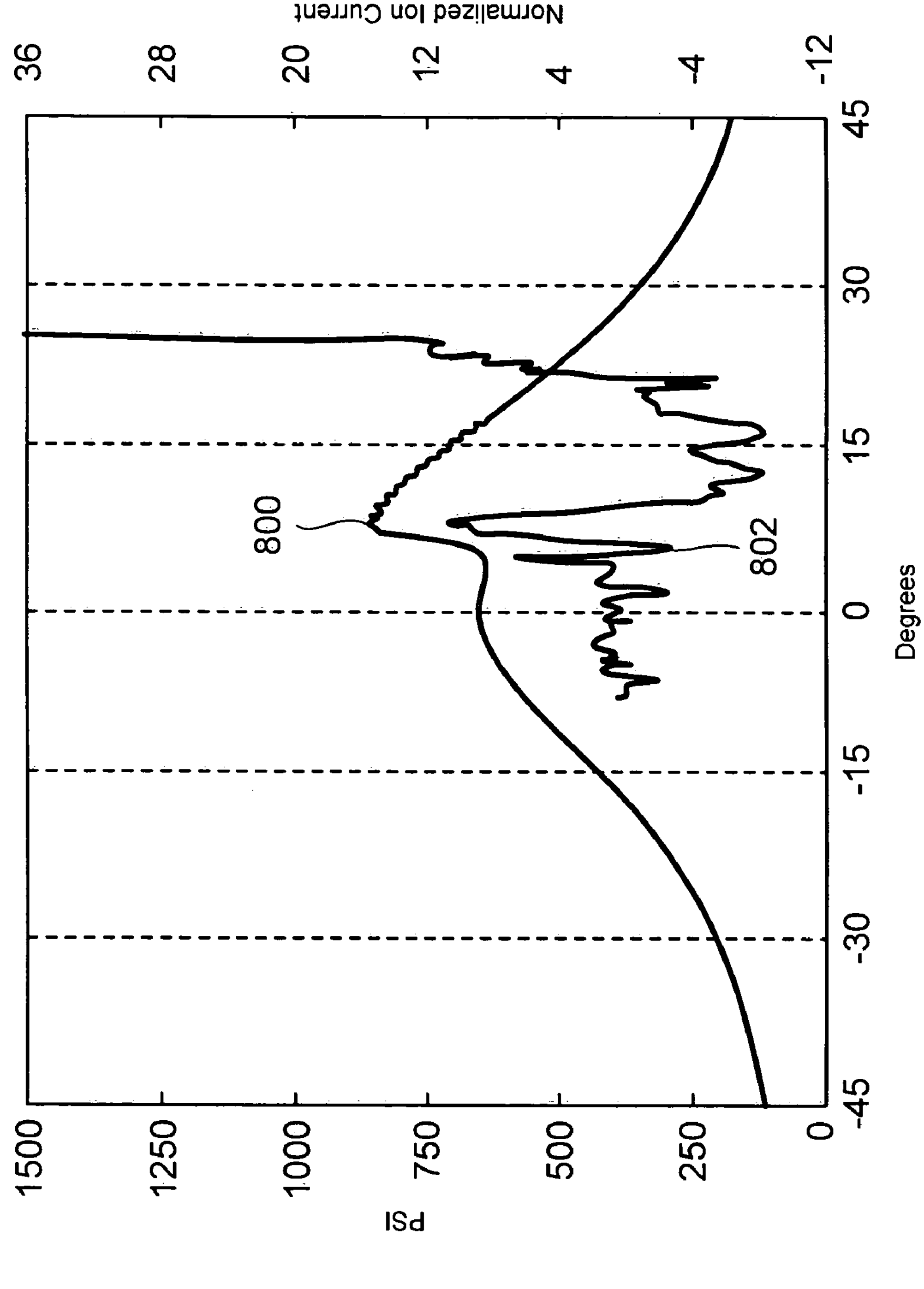
Figure 8D:
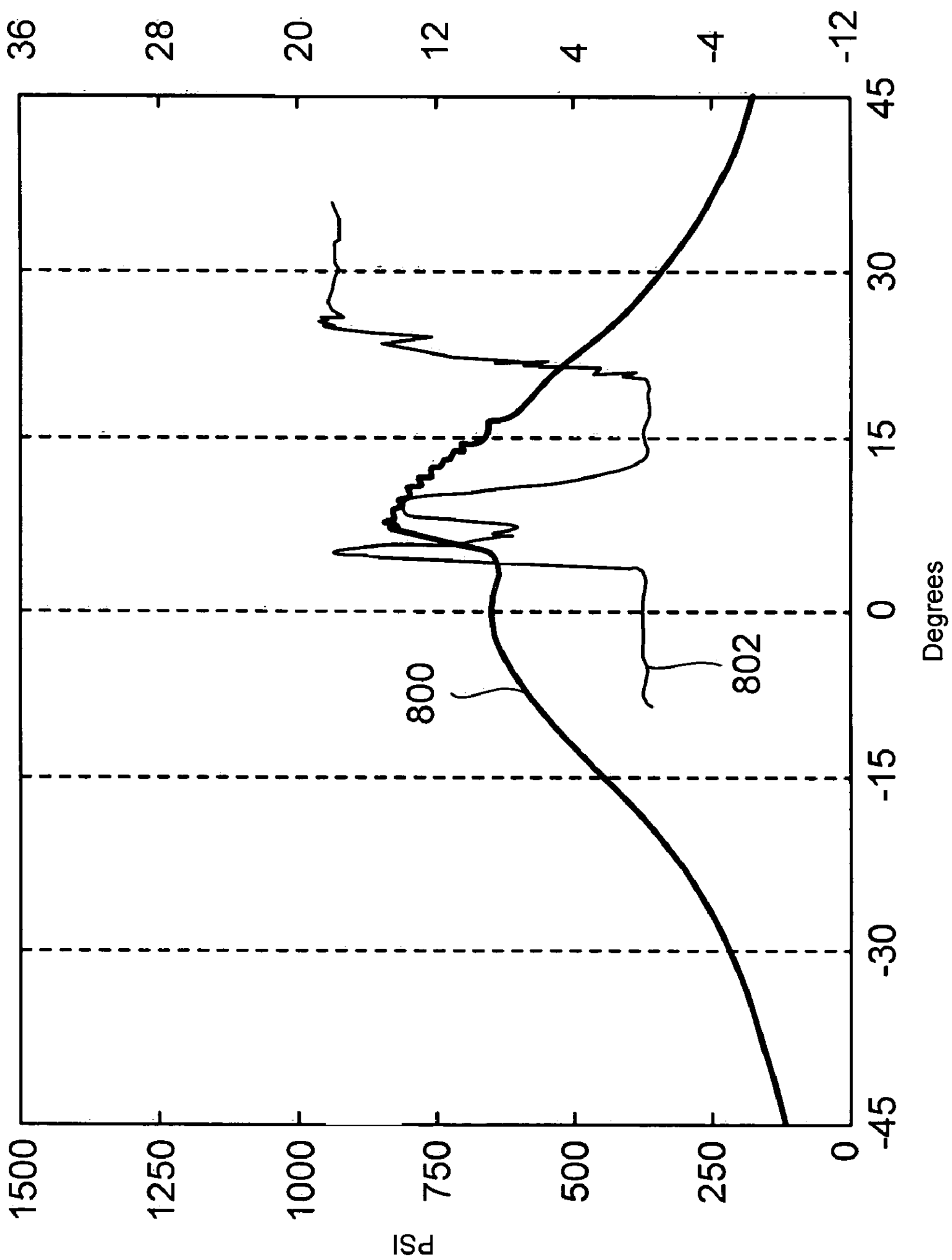

As previously indicated, the spark plug sensor may also be used to replace glow plugs to provide a cold start mechanism for diesel ignition. The use of the shield/shroud overcomes the failure of prior art spark ignition systems by keeping the plugs clean from spark plug fouling by diesel fuel. In one embodiment, the spark plug sensor is a high energy plasma discharge plug suitable for direct impingement of fuel spray and engulfment of diffusive flame. The plugs stay clean by the super heating effects of high energy sparks caused by a high-energy plasma discharge. High-energy plasma discharges are generated at currents in the ampere range as compared to high energy sparks that are generated in the hundreds of milli-amperes range. The cleaning can be seen in FIGS. 8*a*–8*d*. FIG. 8*a* illustrates a fouled plug where the ion current 802 is shunted and does not track the combustion pressure 800. FIGS. 8*b* and 8*c* show that some signal is resumed in the ion current 802 due to the cleaning action of the high-energy plasma discharge. FIG. 8*d* shows a full signal of the ion current 802 tracking the combustion pressure as a result of the fouling being completely removed.

As described hereinbelow, the ion sensor (e.g., the spark plug sensor) can detect start of combustion (SOC), combustion duration, and conditions such as misfire. This provides the ability to control and optimize the combustion process with high EGR in SI, diesel, HCCI, and dual mode of combustion modes. By preventing misfire and igniting the fuel mixture via the spark action and using surface gap spark plugs, the spark plug sensor can lower the cold start emissions of a diesel engine. The spark plug sensor can replace the glow plugs used in systems and reduce or eliminate the need for block heaters and intake air heaters that have been used to assist in the cold start process of a diesel engine. Additionally, the spark plug can be used to provide a high energy spark to prevent late combustion or prevent a misfire when the engine ECU (or ionization module) senses that combustion has not begun on time.

Figure 11A:
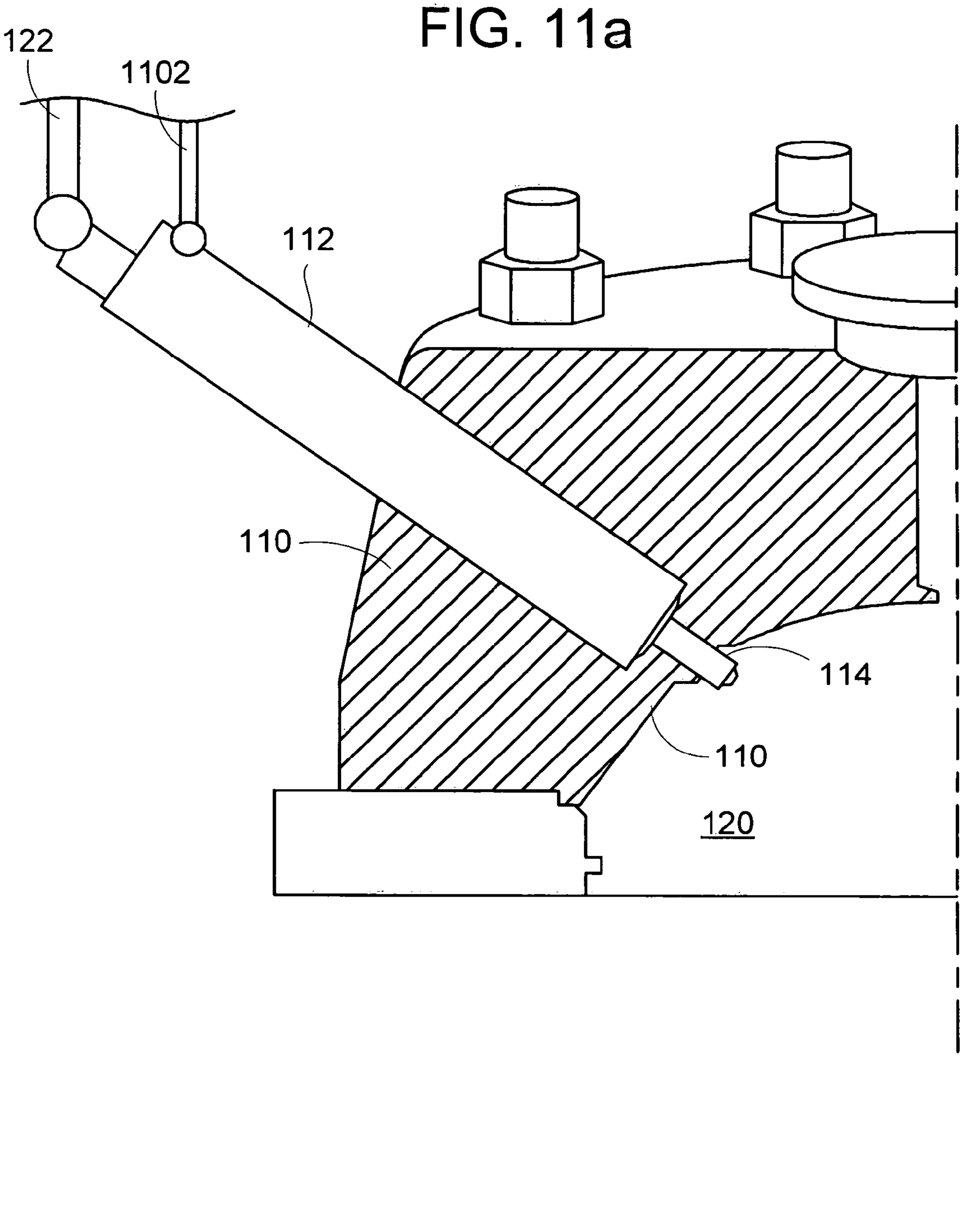
FIG. 11*a* is a schematic view of an alternate embodiment of the ion sensor of the present invention in a sleeve integrated into a fuel injector.
Figure 11B:
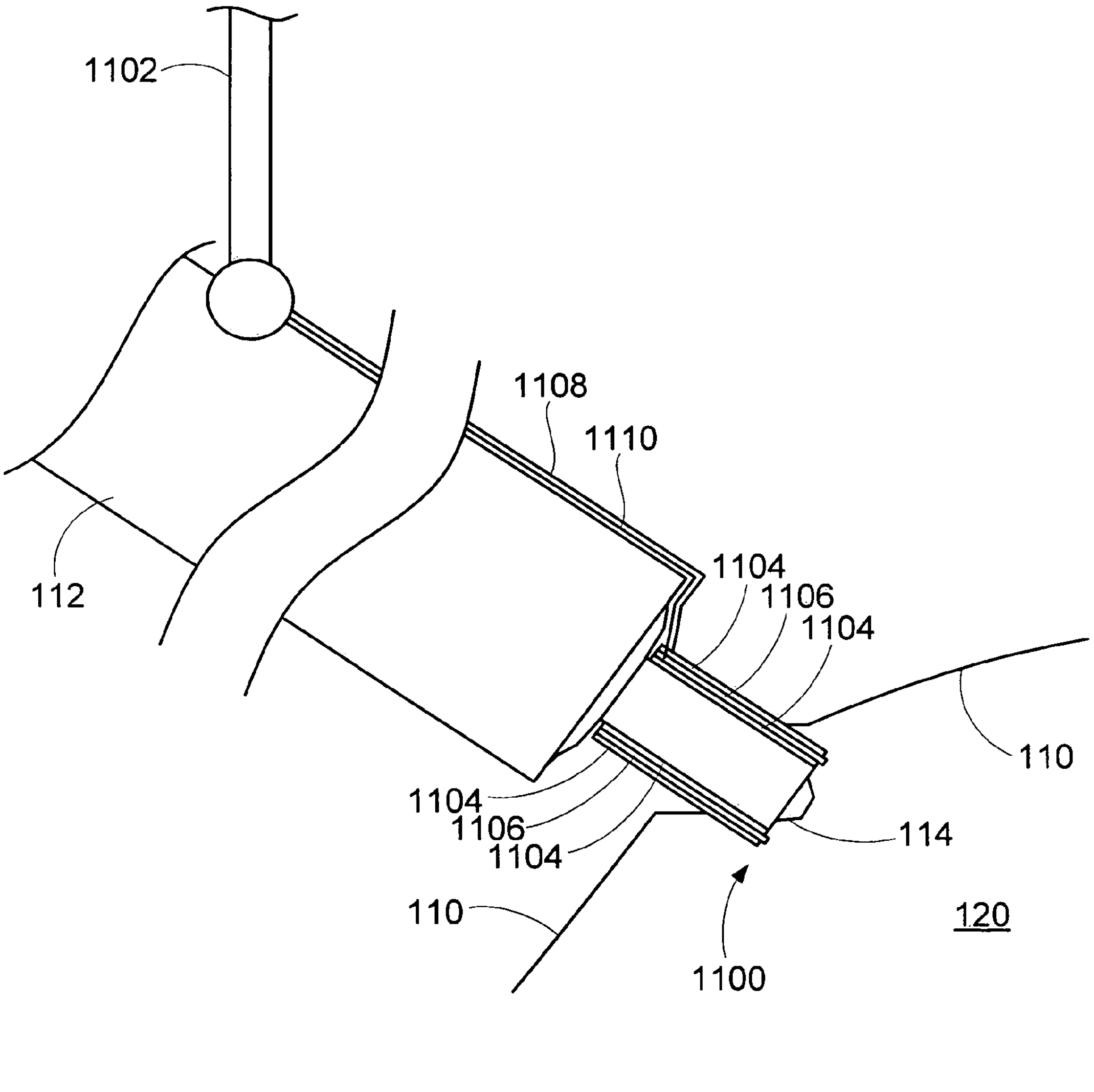
FIG. 11*b* is an enlarged view of the ion sensor of FIG. 11*a*.

Turning now to FIGS. 11*a* and 11*b*, a fuel injector 112 with an ion-sensing sleeve 1100 around the nozzle 114 is shown. The controls 1108, 1110 for the sensor 1100 are routed down the injector 112 and are routed to the ionization module 102 and driver 104 via connection 1102 that is away from fuel injector inlet line 122. The controls comprise the ion bias voltage and heating current control 1110 that heat the electrode 1106 and a thermocouple 1108 for sensor temperature feedback control. It is important to keep the electrode 1106 at a sufficiently high temperature (e.g., 700 C) to prevent the formation of electrically conductive contaminants that can short the ion-sensing electrode, such as carbon, on the surface of the wafer. The ion bias voltage and heating current control 1110 provide sufficient current to maintain or otherwise keep the electrode 116 at the desired temperature. In one embodiment, this is accomplished by heating the sensor sleeve 1104 (e.g., a ceramic wafer). The sensor sleeve 1104 can be made, for example, out of Silicon Nitrate wafer, with an imbedded electrode 1106 made, for example, out of Titanium Oxide.

Figure 12:
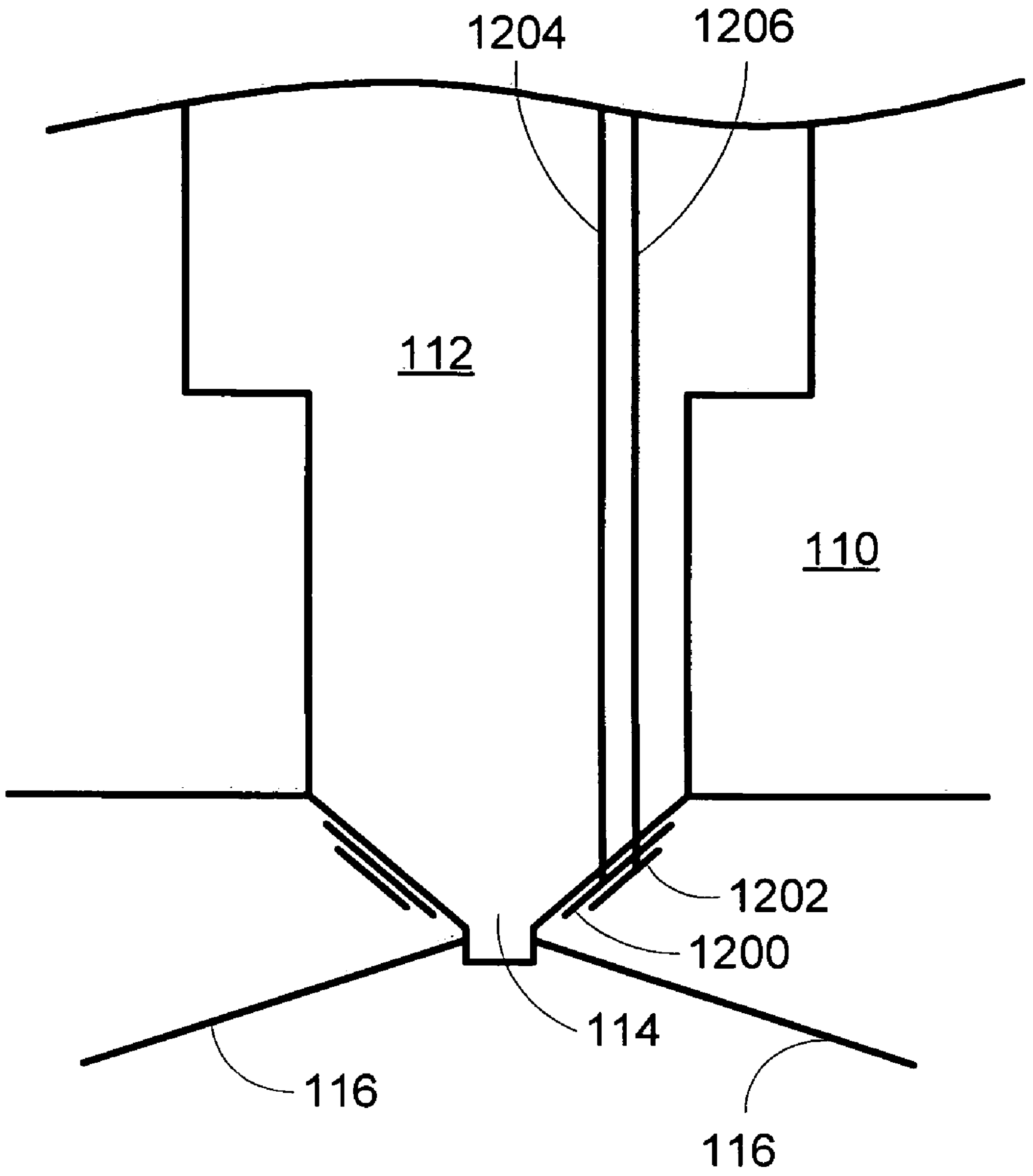
FIG. 12 is a schematic view of a further embodiment of the ion sensor of the present invention integrated into the nozzle tip of a fuel injector.

Other types of arrangements integrating the ion sensor with the fuel injector 112 can be described. For example, in another embodiment of the ion sensor, the ion sensor is integrated directly into the nozzle tip of the fuel injector. This is illustrated in FIG. 12. Turning to FIG. 12, a heater 1200 and an ion sensing element 1202 is integrated directly into the nozzle tip 114. The integrated heater 1200 is controlled via line 1204 by driver 104. The heater 1200 keeps the temperature at around 700 C to protect the ion sensor from contamination. The ion sensing element 1202 is controlled by ionization module 102 via line 1206. The principle objective is to integrate the ion-sensor in the fuel injector 112 to eliminate the need of adding an extra opening in the engine cylinder head for the ion-sensor apparatus. Regardless of how the ion sensor is integrated, a temperature control should be used that keeps the insulating element of the sensor at sufficiently high temperature to prevent the formation of conductive contaminants that can short the ion-sensing electrode. The integrated heater eliminates signal deterioration due to fuel fouling by keeping the ion sensing element 1202 clean from fuel contamination.

Now that the ion sensing apparatus has been described, the control functions that can be used with the ion sensing apparatus will be briefly described. The ionization signal is acquired with respect to an engine parameter over the combustion cycle. For example, the engine parameter may be crank angle, time after ignition, time from top dead center, etc. Crank angle is used herein in its most generic sense to include all of these. For example, crank angle is intended to be generic to measurement of the engine rotational parameter no matter whether it is measured directly in terms of crank angle degrees, or measured indirectly or inferred by measurement. It may be specified with respect to top dead center, with respect to ignition point, etc. In one embodiment, the ionization module 102 receives the ionization signal, analyzes the signal, and provides an indication to the engine ECU 106 of start of combustion, combustion duration, or abnormal conditions such as misfire conditions and to other modules as requested. The ECU 106 determines what action to take. In another embodiment, the ionization signal is provided to the engine ECU 106 or other modules with or without signal processing.

It can be seen from the foregoing that an apparatus and method to detect ion current and perform EGR control, fuel injection timing, and diesel ignition cold starts has been described. The apparatus eliminates the need for a glow plug by using a spark plug type of sensor or an ion sensor integrated onto a fuel injector. The spark plug type of ion sensor can also be used to provide cold start of diesel ignition at reduced levels of hydrocarbon emissions. Signal deterioration of the ion sensor due to fuel fouling is eliminated by means of either a high energy plasma discharge or a heater that keeps the sensor area clean from fuel contamination. The spark plug type of sensor also allows detection of combustion ions from pre-mixed flame instead of diffusive flame, thereby allowing correlation of the combustion ions with combustion quality (e.g., $NO_x$ emission level).

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ion sensing apparatus for detecting ion current in a combustion chamber of a diesel engine comprising:
- a spark plug having electrodes for sensing ion current; and
- a shield integrally attached to the spark plug such that the shield is adaptable to protect the electrodes from direct impingement of fuel spray and engulfment of diffusive flame, wherein the shield includes at least one induction orifice.

2. The ion sensing apparatus of claim 2 wherein the shield encloses the electrodes and forms a shielded space such that the diffusive flame is filtered through the at least one induction orifice to cause primarily premixed flame to occur within the shielded space.

3. The ion sensing apparatus of claim 1 wherein the shield comprises a shroud.

4. The ion sensing apparatus of claim 1 wherein the shield is further adaptable to be removed.

5. The ion sensing apparatus of claim 1 wherein the shield is sized such that a portion of the fuel spray directly impinges the electrodes.

6. An ion sensing apparatus for detecting ion current in a combustion chamber of a diesel engine comprising:
- a spark plug having electrodes for sensing ion current;
- a shield integrally attached to the spark plug such that the shield is adaptable to protect the electrodes from direct impingement of fuel spray and engulfment of diffusive flame; and
- a control module including an ionization module for detecting and analyzing the ion current and a plasma driver module for providing high energy sparks to the spark plug such that the spark plug can recover from fuel fouling.

7. The ion sensing apparatus of claim 6 wherein the ionization module is adapted to detect at least one of start of combustion and combustion duration from at least one ion current signal.

8. The ion sensing apparatus of claim 7 wherein the ionization module is adapted to detect the start of combustion by determining a location where the at least one ion current signal rises above a threshold value and indicating that the start of combustion is at the location where the at least one ion current signal rises above the threshold value.

9. The ion sensing apparatus of claim 7 wherein the ionization module is adapted to detect the combustion duration by
- determining a first location where the at least one ion current signal rises above a first threshold value;
- determining a second location where the at least one ion current signal falls below a second threshold value; and
- setting the combustion duration to the difference between the first location and the second location.

10. A method to cold start a diesel engine in accordance with the spark plug of claim 1 comprising the step of providing a spark to the spark plug located in a combustion chamber of the diesel engine wherein the energy of the spark is of a sufficient magnitude to ignite the diesel fuel mixture in the combustion chamber.

11. The method of claim 10 wherein the step of providing the spark to the spark plug comprises providing energy of a magnitude that keeps carbon build-up off ceramic surfaces of the spark plug.

12. The method of claim 10 further comprising the step of providing the spark to the spark plug when combustion of the diesel fuel mixture has not begun on time.

13. The method of claim 12 wherein the step of providing the sparks to the spark plug when combustion of the diesel fuel mixture has not begun on time comprises the step of providing energy to the spark plug if combustion has not been sensed prior to a specified crank angle.

14. An ion sensing apparatus for detecting ion current in a combustion chamber of a diesel engine comprising:
- a fuel injector; and
- an ion sensing mechanism integrally attached to the fuel injector such that the ion sensing mechanism is protected against direct impingement of fuel spray, the ion sensing mechanism including an electrode surrounded by a sleeve that is attached to the fuel injector.

15. The ion sensing apparatus of claim 14 wherein the electrode is operable at a temperature sufficiently high enough to prevent the formation of electrically conductive contaminants on the surface on the electrode.

16. The ion sensing apparatus of claim 14 wherein the electrode is formed from Titanium Oxide.

17. The ion sensing apparatus of claim 14 wherein the sleeve is formed from a silicon nitrate wafer.

18. An ion sensing apparatus for detecting ion current in a combustion chamber of a diesel engine comprising:
- a fuel injector;
- an ion sensing mechanism integrally attached to the fuel injector such that the ion sensing mechanism is protected against direct impingement of fuel spray; and
- a sensor temperature feedback control in communication with the ion sensing mechanism.

19. The ion sensing apparatus of claim 18 wherein the sensor temperature feedback control includes a thermocouple.

20. An ion sensing apparatus for detecting ion current in a combustion chamber of a diesel engine comprising:
- a fuel injector having a nozzle;
- an ion sensing mechanism integrally attached to the fuel injector such that the ion sensing mechanism is protected against direct impingement of fuel spray, the ion sensing mechanism comprising:
- a heating element attached to the nozzle; and
- an ion sensing element adjacent to the heating element and adaptable to be attached to the heating element.

21. The ion sensing apparatus of claim 20 wherein the heating element is operable to keep the ion sensing element at a temperature sufficiently high to prevent the formation of electrically conductive contaminants on the surface on the ion sensing element.

22. An ion sensing apparatus for detecting ion current in a combustion chamber of a diesel engine comprising:

a fuel injector;

an ion sensing mechanism integrally attached to the fuel injector such that the ion sensing mechanism is protected against direct impingement of fuel spray; and a control module including an ionization module for detecting and analyzing the ion current and a driver module for providing current to ion sensing mechanism that is sufficiently high enough to prevent the formation of electrically conductive contaminants on the surface on the ion sensing element through resistive heating.

23. The ion sensing apparatus of claim 22 wherein the ionization module is adapted to detect at least one of start of combustion and combustion duration from at least one ion current signal.

24. The ion sensing apparatus of claim 23 wherein the ionization module is adapted to detect the start of combustion by determining a location where the ion current rises above a threshold value and indicating that the start of combustion is at the location where the at least one ion current signal rises above the threshold value.

25. The ion sensing apparatus of claim 23 wherein the ionization module is adapted to detect the combustion duration by determining a first location where the at least one ion current signal rises above a first threshold value;

determining a second location where the at least one ion current signal falls below a second threshold value; and setting the combustion duration to the difference between the first location and the second location.

26. An ion sensing apparatus for detecting ion current in a combustion chamber of a diesel engine comprising:

a plasma discharge plug having electrodes for sensing ion current;

a shield integrally attached to the plasma discharge plug such that the shield is adaptable to protect the electrodes from a portion of direct impingement of fuel spray and engulfment of diffusive flame.

27. The ion sensing apparatus of claim 26 wherein the shield includes at least one induction orifice.

28. The ion sensing apparatus of claim 27 wherein the shield encloses the electrodes and forms a shielded space such that the diffusive flame is filtered through the at least one induction orifice to cause primarily premixed flame to occur within the shielded space.

29. The ion sensing apparatus of claim 26 wherein the shield comprises a shroud.

30. The ion sensing apparatus of claim 26 wherein the shield is further adaptable to be removed.

31. The ion sensing apparatus of claim 26 further comprising a control module, the control module including an ionization module for detecting and analyzing the ion current and a plasma driver module for providing high current to the plasma discharge plug such that the plasma discharge plug can recover from fuel fouling.

32. The ion sensing apparatus of claim 31 wherein the ionization module is adapted to detect at least one of start of combustion and combustion duration from at least one ion current signal.

33. The ion sensing apparatus of claim 32 wherein the ionization module is adapted to detect the start of combustion by determining a location where the at least one ion current signal rises above a threshold value and indicating that the start of combustion is at the location where the at least one ion current signal rises above the threshold value.

34. The ion sensing apparatus of claim 32 wherein the ionization module is adapted to detect the combustion duration by determining a first location where the at least one ion current signal rises above a first threshold value;

determining a second location where the at least one ion current signal falls below a second threshold value; and setting the combustion duration to the difference between the first location and the second location.

* * * * *